June 27, 1961 J. B. MACKAY ET AL 2,990,539

TRANSISTOR AMPLIFIERS

Filed May 25, 1955 2 Sheets-Sheet 1

*INVENTORS*
JAMES B. MACKAY
JOSEPH C. LOGUE
*BY* RAYMOND W. EMERY

ATTORNEY

INVENTORS
JAMES B. MACKAY
JOSEPH C. LOGUE
RAYMOND W. EMERY
BY [signature]
ATTORNEY 2,990,539
Patented June 27, 1961

2,990,539

TRANSISTOR AMPLIFIERS

James B. Mackay, Highland, and Joseph C. Logue and Raymond W. Emery, Poughkeepsie, N.Y., assignors to International Business Machines Corporation, New York, N.Y., a corporation of New York Filed May 25, 1955, Ser. No. 511,082
18 Claims. (Cl. 340—174)

This invention relates to transistor amplifiers and particularly to amplifiers for use with the windings of magnetic storage cores. Although certain of the amplifiers disclosed herein are particularly intended for use with high power output transistors of the type disclosed in FIG. 7 of the copending application of Richard F. Rutz, Serial No. 458,619, filed September 27, 1954, entitled "Transistor Circuit Element," now Patent No. 2,889,499, these amplifiers have certain features which are useful in connection with other types of transistors.

Magnetized cores formed of magnetic materials having high remanence provide useful data storage or memory devices, since they may be magnetized with fields of one polarity or the other to store data or information coded in a binary system, and when so magnetized retain the stored information for an indefinite length of time, until subjected to a magnetic field of the opposite polarity.

Magnetic cores having convenient dimensions require substantial magnetomotive forces to magnetize them. For example, the cores described herein require in the neighborhood of 800 milliamperes through a single turn winding for magnetic saturation.

It has been desired to provide a transistor amplifier circuit for driving such a magnetic core, i.e. for supplying to a magnetizing coil on the core a current of sufficient magnitude and of proper polarity to magnetize the core selectively in either direction. Transistor amplifiers have well known low current and voltage requirements and hence low power losses. However, most of the transistors heretofore available have not had sufficient power output capacity combined with high frequency response to be usable in a core driving amplifier.

The transistor described in FIG. 7 of the Rutz application, Serial No. 458,619, mentioned above, has the required power output capacity, but when used in the grounded emitter connection it also has a characteristic analogous to that of a thyratron, in that a current flow once initiated maintains itself until interrupted by means external to the transistor.

An object of the present invention is to provide an improved amplifier for driving magnetic cores.

Another object is to provide an amplifier of the type described including a thyratron transistor and self-extinguishing means for cutting off the current flow through the transistor. A further object is to provide improved self-extinguishing means for such an amplifier.

Another object is to provide an improved core sensing amplifier for a magnetic storage core.

Another object is to provide an improved data storage matrix including magnetic cores.

The foregoing and other objects of the invention are attained by providing a high power output transistor of the type described, connected in a core driving amplifier section including means for biasing the transistor Off, signal input means operable to turn the transistor On, and self-extinguishing means effective to cut the transistor Off after termination of the input signal. The self-extinguishing means preferably takes the form of an impedance connected in series with the emitter of the transistor and effective when a heavy current flows through the transistor to develop a potential drop across the impedance having a polarity and magnitude sufficient to swing the emitter potential below its cut-off point. The extinguishing impedance is shown, in various modifications described herein, as a capacitor, a delay line, or a resistor. In the modifications including capacitors, means are provided for discharging the capacitors after the thyratron transistor is cut off. In the modification which includes a resistor as the extinguishing impedance, the input signal is supplied through a preamplifier stage, and the resistor serves as a load resistor for that stage when it is conducting.

The thyratron transistor is in each case coupled through a tape-core transformer to a plurality of windings connected in series and mounted on a corresponding plurality of storage cores. The tape-core transformer has characteristics similar to that of the storage core in that it becomes permanently magnetized in one sense or the other. In order for it to accept successive signals of the same polarity from the amplifier, its core must be reset between signals. A core resetting amplifier section similar to the core driving amplifier section is provided for that purpose. The load circuit for the thyratron transistor is returned to a substantially constant current source or sink. Several modifications of such sinks are shown and described.

The amplifier for the signal obtained when the magnetic state of the core is sensed comprises a first grounded base transistor amplifier stage having its input conductively coupled to a sensing winding on the core, and having its output coupled through a transformer and a full wave rectifier to the input of a grounded emitter stage. The grounded emitter stage is biased beyond cut off so that it rejects all input signals below a certain amplitude, and is driven to saturation by each input signal sufficiently above this amplitude so that it provides a square wave output.

Other objects and advantages of the invention will become apparent from a consideration of the following description and claims, taken together with the accompanying drawings.

FIG. 1

Figures 1, 2, 3, 4, 5:
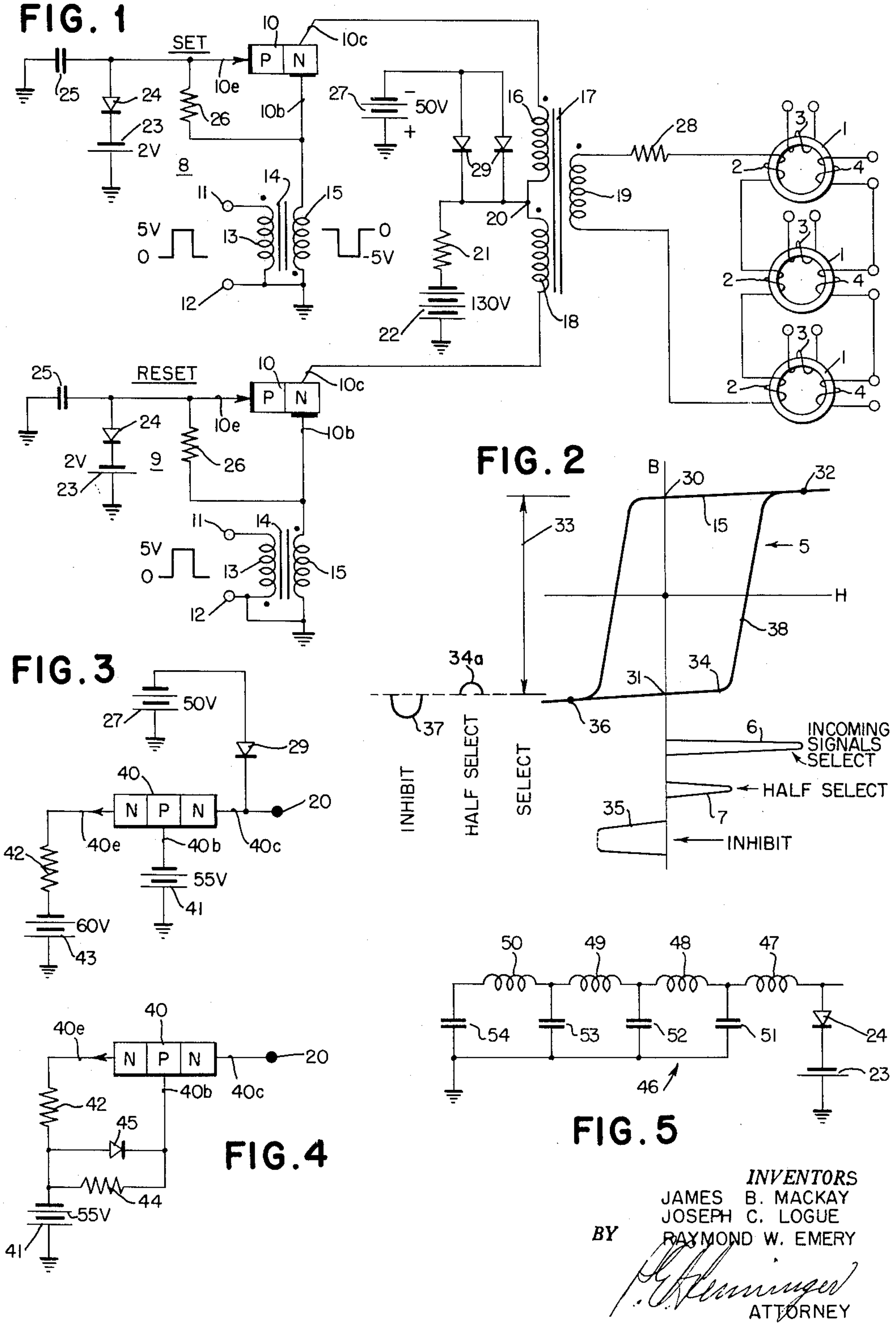
FIG. 1 is a wiring diagram of a core driving amplifier constructed in accordance with the present invention.
FIG. 2 is a graphical illustration of the magnetic characteristics of the tape core employed as the transformer shown in the circuit of FIG. 1, with input and output signals of various magnitudes shown thereon.
FIG. 3 is a fragmentary wiring diagram of a constant current source adapted for use in the circuit of FIG. 1.
FIG. 4 is a wiring diagram of another form of constant current source which may be used in place of that shown in the circuit of FIG. 1.
FIG. 5 is a fragmentary wiring diagram showing a delay line as a self-extinguishing impedance and intended for substitution for a portion of the circuit of FIG. 1.

This figure shows an amplifier for driving a plurality of magnetic cores, such as a column of three magnetic storage cores 1. Each core 1 is provided with two half-select windings 2 and 3 and a sensing winding 4. The sensing windings 4 of all the memory cores are connected in series. All three of the half-select windings 2 in the circuit of FIG. 1 are connected in series to the output of the amplifier. The cores 1 are made of magnetic ferrite material, such as that commercially known as S1 material, having a substantially rectangular hysteresis loop as shown at 5 in FIG. 2. Such a core may be magnetized to saturation in one sense or the other by applying to one of its half-select windings 2 or 3, a select signal of the amplitude indicated at 6 in FIG. 2. Alternatively, the core may be magnetized to saturation in one sense or the other by the simultaneous application to the two half-select windings 2 and 3 of signal pulses of the amplitude illustrated at 7 in FIG. 5.

In a core storage matrix, as will be understood by those skilled in the art, a large number of cores are mounted in an array, which may include, for example, 20 rows and 20 columns, totaling 400 cores. Each row and each column is then provided with a core driving amplifier of the type illustrated. The selection of three cores for connection to the output of the amplifier of FIG. 1 is for purposes of illustration only, and considerably larger numbers may be connected to a single amplifier. Alternatively, an amplifier may be connected to drive a single core.

The complete amplifier of FIG. 1 comprises two sections, hereinafter identified as the "set" section 8 and the "reset" section 9. The set and reset sections are generally similar, except for differences specifically mentioned hereinafter. The same reference numerals have therefore been used for corresponding parts of the two sections. The set section will be described in detail. Only those portions of the reset section which differ from the set section will be described in detail.

The set section 8 includes a high power output transistor 10, of the type described in the Rutz application, Serial No. 458,619, mentioned above, comprising a body of semi-conductive material including a PN junction, and having an emitter **10*e* with an ohmic connection to the P region of the body, a base electrode 10*b* with an ohmic connection to the N region of the body, and a collector electrode 10*c*** having a point contact connection to the N region. The dimensions of the P and N regions are as described in the copending Rutz application mentioned above.

Input signals are supplied to the set section 8 through terminals 11 and 12, which are connected to the opposite ends of a primary winding 13 of an input transformer 14 having a secondary winding 15 connected between base electrode **10*b* and ground. The polarity relationships of the windings 13 and 15 are illustrated in the drawing. If the direction of the primary winding 13** is reversed, and the polarity of the input signal is also reversed, the action of the circuit will be unaffected.

Collector **10*c* is connected in series with a primary winding 16 of a tape-core transformer 17 which also has another primary winding 18 and a secondary winding 19. The tape-core transformer 17 may be of the type described and claimed in the copending application of Richard G. Counihan, Serial No. 440,983, filed July 2, 1954, entitled Magnetic Core Current Driver, now Patent No. 2,902,677. The two primary windings 16 and 18 are connected to a common tap 20 which is connected to ground through a constant current source illustrated in FIG. 1 as including a high resistor 21 and a battery 22**.

Emitter **10*e* is biased to a potential of −2 volts by a battery 23 connected to the emitter 10*e* through a diode 24. Battery 23** has its opposite terminal grounded.

A capacitor 25, hereinafter referred to as the extinguishing or self-extinguishing capacitor, is connected between ground and the emitter **10*e*. A capacitor discharging resistor 26 is connected between emitter 10*e* and base 10*b***.

The potential of tap 20 is clamped at −50 volts by a battery 27 having its negative terminal connected to the tap 20 through several parallel diodes, two of which are shown at 29. A single diode would suffice if it were capable of conducting sufficient current in the forward direction without exceeding its rating.

The secondary winding 19 of transformer 17 is connected to a series circuit including the half-select windings 2 of the cores 1 and a resistor 28.

The primary winding 18 is connected to the reset section 10 of the amplifier with its polarity reversed as compared to the manner in which primary winding 16 is connected to the set section 8 of the amplifier.

*Operation of FIG. 1*

The biasing battery 23 normally holds the emitter **10*e* at a potential lower than its cut-off point for the non-conducting condition of transistor 10, so that the transistor 10 is substantially non-conductive. An input signal of 5 volts appearing at terminals 11 and 12 is transmitted through transformer 14 and appears in secondary winding 15 at substantially the same potential and with a polarity effective to swing the base 10*b* more negative than the emitter 10*e*, thereby turning the transistor 10 On and initiating a current flow in the output circuit including primary winding 16, resistor 21 and battery 22. This current flow continues after the termination of the input signal 15, because of the inherent internal feedback characteristics of the transistor 10 as described in the Rutz application, Serial No. 458,619, mentioned above. By suitable alteration of the turns ratio of transformer 14, an input signal of amplitude greater or less than 5 volts may be caused to operate transistor 10 in the same manner as above. A part of this current flow passes through capacitor 25 and emitter 10*e*. As it flows through capacitor 25, it is effective to set up a charge on that capacitor such that its right-hand terminal is negative. As the charge on the capacitor 25 increases, the emitter 10*e* becomes increasingly negative and, after the input signal at base 10*b* terminates, soon reaches a point at which the transistor 10 again cuts off. Note that diode 24 permits the emitter potential to swing to a value substantially more negative than the negative terminal of battery 23**.

After the transistor 10 cuts off, the charge on the capacitor 25 leaks off through the resistor 26 and secondary winding 15 to ground. The duration of the output pulse in the winding 16 is controlled by the values of the capacitor 25, and the current through the collector **10*c*. In a circuit using an IBM Type X4 transistor, it has been found that the pulse duration may be held within close limits to a mean value of two microseconds. The output wave form departs somewhat from the ideal square wave, having a certain amount of droop due to variation of the emitter potential as the capacitor 25** charges.

The output transformer 17 is a step-down transformer, and steps up the current to the value required in the input windings 2 of the magnetic storage cores 1.

The transformer 17 is preferably but not necessarily a Permalloy tape-core transformer of the type described in the copending Counihan application, Serial No. 440,983, previously mentioned. Such a core has a substantially rectangular hysteresis loop, such as that shown at 5 in FIG. 2, and a high remanence so that when the windings on it are not energized, the magnetic condition of the core is either at 30 or 31 in FIG. 2. If, when the core has a residual field such as that shown by the point 31 in FIG. 2, a select signal 6 is applied to the core winding, then the condition of magnetization of the core will move to the saturated condition defined by the point 32, in FIG. 2. When the incoming signal 6 terminates the magnetic core will return to the magnetic condition defined by the point 30, so that the effect is to produce a net change in magnetization indicated at 33 in FIG. 2.

If such a core receives an incoming signal of only half the magnitude of the select signal, such as the half-select signal indicated at 7, then the condition of the core shifts from that at point 31 to that at point 34 during the signal and when the signal terminates, the magnetic condition of the core returns to point 31. The magnetic condition of the core in such an instance has a very small variation illustrated by the curve 34a in FIG. 2, and little net change in flux.

Such a core may be inhibited by applying to any of its windings a current sufficient to produce a signal such as that shown at 35 in FIG. 2, having at least the strength of a half-select signal, but of the opposite polarity. Such an inhibiting input pulse has the effect of reducing the incoming select signals to half-select signals so that they produce substantially no output signal. The inhibiting pulse 35 itself produces only a negligibly small output signal, due to the shifting of the magnetic condition of the core from the point 31 to point 36 and return. Such an output signal is illustrated at 37 in FIG. 2.

In the arrangement described herein, it is considered that each core driving amplifier produces a half-select signal, and that coincident energization of the two coils 2 and 3 of a core 1 in the appropriate directions are required to shift the polarity of its magnetic field.

After an input signal has once been transmitted through the set section 8 of the core driving amplifier, the tape core of transformer 17 must be reset in order that a following signal through the set section may be effective. This resetting is accomplished by applying a resetting signal, similar to the setting signal, to the input terminals 11 and 12 of the reset amplifier section 9, thereby sending a current pulse through the primary winding 18 of transformer 17. Winding 18 is connected so that the current which flows through it is of the opposite polarity to the current which flows through winding 16. It is therefore effective to shift the magnetic condition of the core from point 31 in Fig. 2, which was the initial condition of magnetization assumed above, to point 36 and then back to point 31, or from point 30 to point 36, and thence to point 31.

In order that the output pulses produced in the secondary winding 19 of transformer 17 may be usable in the storage cores 1, it is required that such output pulses be substantially flat topped. This similarly requires that the input current pulses in the windings 16 and 18 be substantially flat topped. For that purpose, the source of electrical energy connected to the common tap 20 is a substantially constant current source. In FIG. 1, this source comprises a high resistor 21 in series with a battery 22. The high resistor 21 has the effect of maintaining the collector current between fixed limits determined by the maximum and minimum values of load resistance reflected into the primary winding of transformer 17 and the change in voltage across capacitor 25. Since the impedance of resistor 21 is appreciably greater than either of these load resistance values, the variation in collector current at different loads is much smaller than would otherwise be the case.

The clamp circuit including the diodes 29 and the battery 27 limits the negative swing of the junction 20 to −50 volts. The principal function of this clamp circuit is to protect the transistor 10 from excessive collector voltage, which would cause damage.

The resistor 28 in series with secondary winding 19 of the transformer 17 performs four functions, namely: (1) to reduce the droop in the output current pulse amplitude; (2) to stabilize the initial value of the output current pulse amplitude; (3) to stabilize the width of the output current pulse; (4) to prevent partial switching of transformer 17.

These four functions are explained in detail in the correspondingly numbered paragraphs below:

(1) When capacitative self-extinguishing of transistor 10 is used, the voltage at the collector may droop as much as 20 volts during the time the transistor is on. To reduce the effect of this droop on the collector current, which is intended to be substantially constant, it is desirable to return the lower end of resistor 21 to as low (i.e. large negative) a voltage as possible. The variation of 20 volts at the collector then represents a smaller fraction of the total voltage drop, and so causes a smaller fractional variation in collector current. Increasing the potential of battery 22 requires a corresponding increase in the total voltage drop between battery 22 and collector 10c. This total drop is comprised of the drop across resistor 21, plus the drop across the primary of transformer 17. Two ways of increasing potential drop appear: (1) by increasing the drop across resistor 21 and (2) by increasing the drop across primary 16. For a given value of collector current, increasing the drop across resistor 21 means using a larger resistor, and hence increased D.C. power dissipation. However, adding resistor 28 in the secondary of transformer 17 requires a larger primary volt drop for the same value of secondary current, and so helps to reduce the effect of the 20 volt swing on the collector current.

(2) The load presented to the transformer 17 by one half-select line of a two-dimensional memory array (or by one half-select plane of a three dimensional array) is a function of the information content of the cores on the line (or plane). This arises from the fact that the voltage induced in a driver line by a driven core depends on whether the core contains a binary "1" or a binary "0," even though the core may be only half-selected. When a number of cores is connected in series on one half-select line, the possible variation in induced voltage between the cases when all the cores contains 1's and all contain 0's may be considerable, in addition to the much larger variations caused by information content of the fully selected core (cores) on the line (plane). This change in induced voltage may be reduced to an equivalent change in load resistance on the transformer. Addition of the fixed resistor 28 helps to reduce the fractional change in the total load resistance, which in turn helps to keep the initial amplitude of the output current pulse from varying according to information content of the load.

(3) The time taken to switch the transformer is inversely proportional to the secondary terminal voltage. The drop across resistor 28 being large in comparison to the possible variation in drop across the memory cores driven, helps to maintain a constant secondary terminal voltage, and so a constant output pulse width.

(4) Should the driven memory cores complete switching before the transformer has fully switched, the drop across resistor 28 prevents the transformer secondary from seeing a shot-circuit, which would prevent the transformer core from switching any further, i.e. from completing its switching. If such a short-circuit occurred on a "read" cycle, reset of the transformer on the subsequent "write" cycle would give insufficient secondary voltage to write into the memory array.

FIG. 3

This figure illustrates an alternative form of constant current source which may be used in place of the resistor 21 and battery 22 of FIG. 1 in those circuits where the current requirements are not too high for the ratings of available junction transistors. In the circuit of FIG. 3, there is used a junction transistor 40 having an emitter 40e, a base 40b and a collector 40c. Collector 40c is connected to tap 20. Base 40b is connected to ground through a battery 41. Emitter 40e is connected to ground through a resistor 42 and a battery 43.

In this circuit, the resistor 42 effectively fixes the emitter current and thereby the collector current. If the diode 29 is reverse biased, as shown, then the collector current will be substantially constant regardless of the collector potential, as can be seen from examination of typical collector characteristics of any junction transistor.

FIG. 4

This figure shows another constant current source which may be substituted for the resistor 21 and battery 22 of FIG. 1. This circuit also uses an NPN junction transistor 40, similar to the transistor 40 of FIG. 3. In this circuit, the emitter 40*e* is connected to ground through resistor 42 and battery 41. Between base 40*b* and the negative terminal of battery 41 are connected a resistor 44 in parallel with a Zener diode 45, i.e. a silicon junction alloy diode having a 5-volt Zener value.

For low values of collector current the impedance of the diode 45 will be high, and the circuit will appear as a modified grounded emitter stage having relatively low collector impedance. For high values of collector current, the diode 45 will be driven into its low impedance Zener region and the circuit will operate as a grounded base stage, with corresponding high collector impedance.

FIG. 5

This figure shows the use of a delay line generally indicated by the reference numeral 46 to replace the capacitor 25 in the circuit of FIG. 1. The delay line comprises four coils 47, 48, 49 and 50, and four capacitors 51, 52, 53 and 54, connected in a conventional fashion. This provides a more accurate control of the output pulse width than the circuit of FIG. 1, since the energy stored in the coils is available for swinging capacitors negative and cutting off the transistor. Also, it reduces the potential swing at the collector which occurs during the charging of the capacitor 25 and thereby improves the wave form of the output pulses delivered to the transformer primary winding 16.

FIG. 6

This figure illustrates an amplifier which may be substituted for the core driving amplifier of FIG. 1. In this amplifier, those elements which correspond exactly to their counterparts in FIG. 1 have been given the same reference numerals and will not be further described. The circuit elements of FIG. 6 which differ from those of FIG. 1 are in the emitter and base circuits of the transistor 10. The base 10*b* is connected directly to ground. The emitter 10*e* is connected to the collector 55*c* of a PNP junction transistor 55, having a base 55*b* and an emitter 55*e*. Emitter 55*e* is connected to ground. Base 55*b* is connected to ground through a resistor 56 and a battery 57. A diode 58 is connected in parallel with resistor 56 and battery 57 between base 55*b* and ground. A capacitor 59 is connected between base 55*b* and an input terminal 60. Another input terminal 61 is grounded.

Collector 55*c* is connected through a resistor 62 and a battery 63 to ground. A resistor 64 is connected between collector 55*c* and ground in parallel with resistor 62 and battery 63.

Figures 6, 7, 8:
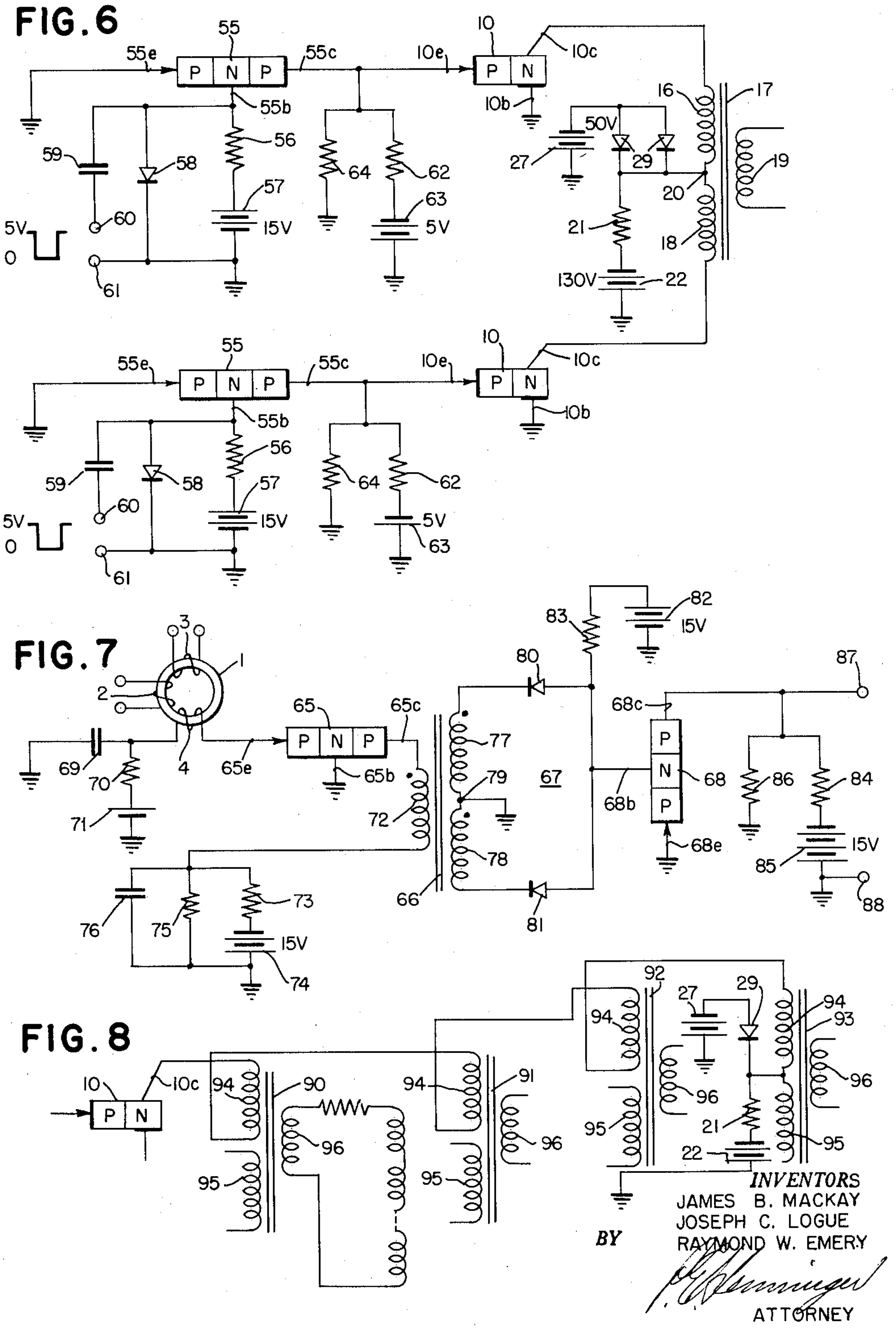
FIG. 6 is a wiring diagram of a modified form of core driving amplifier embodying the invention.
FIG. 7 is a wiring diagram of a core sensing amplifier embodying certain features of the invention.
FIG. 8 is a fragmentary wiring diagram showing a modified core storage matrix which is usable with the amplifiers of FIGS. 1, 6 and 7.

*Operation of FIG. 6*

Battery 57 normally biases the transistor 55 off. The battery 57, resistor 56 and diode 58 form a loop circuit in which current is continually flowing through diode 58 in its forward direction. The potential drop across diode 58 when a current is flowing through it in its forward direction is substantially constant, so that the base 55*b* is held at a potential positive with respect to ground by the amount of that potential drop. Since the emitter 55*e* is grounded, the transistor 55 is biased off by the potential drop across diode 58. Resistors 62 and 64 form a voltage divider with battery 63 so that when transistor 55 is off, the potential of collector 55*c* and of emitter 10*e* is at a negative voltage equal to one-half the potential of battery 63 (5 volts), so that emitter 10*e* is at −2.5 volts, which potential is effective to hold transistor 10 cut off.

When an input signal is received at terminals 60 and 61, the transistor 55 turns on, and a load current flows from its collector through resistor 62 and battery 63. This current increases the potential drop across resistor 62, thereby swinging the potential of collector 55*c* and of emitter 10*e* in a positive sense and turning transistor 10 on. Transistor 10 locks on, due to its internal characteristics. Current now flows from ground through the transistor 55 to emitter 10*e* and also from ground through resistor 64 to the emitter 10*e*. When the input signal at terminals 60 and 61 terminates, transistor 55 switches off again and its collector presents a high impedance in parallel with the resistors 64 and 62. The high current flow through emitter 10*e*, passing through this high impedance combination, produces a potential drop sufficient to reverse bias the emitter 10*e*, thereby cutting off the transistor 10.

The circuit of FIG. 6 has several substantial advantages as compared to the circuit of FIG. 1. The potential variation at the collector 10*c* due to charging of capacitor 25 is removed, so that the droop in the output current wave form is substantially reduced. The recovery time of the circuit is reduced, since it is no longer necessary to discharge capacitor 25 between input pulses. The input signal may be capacitively coupled to the base 55*b*, which coupling is substantially cheaper than the input transformer coupling used in FIG. 1. The source of the input pulse can have a higher impedance than in the circuit of FIG. 1. The output pulse duration is controlled by the input pulse duration and is sensibly independent of the particular transistor 10 which may be used in the circuit. Of course, the circuit of FIG. 6 has the disadvantage of the added expense of another transistor, but the other advantages mentioned above may outweigh this disadvantage.

FIG. 7

This figure illustrates a core sensing amplifier for signals received from the output windings 4 on the cores 1 in FIG. 1. This core sensing amplifier comprises a first stage including a transistor 65 connected as a grounded base amplifier, and coupled through a transformer 66 and a full wave rectifier 67 to a transistor 68 connected as a grounded emitter amplifier.

Transistor 65 has its base 65*b* connected directly to ground. Emitter 65*e* is connected through sensing coil 4 of the storage cores 1, only one of which is shown in FIG. 7, and a capacitor 69 to ground. A resistor 70 and a biasing battery 71 are connected between ground and the common terminal of capacitor 69 and coil 4. Collector 65*c* is connected through the primary winding 72 of transformer 76 and thence through a load resistor 73 and a battery 74 to ground. A resistor 75 and a capacitor 76 are connected in parallel with resistor 73 and battery 74.

The transformer 66 has two secondary windings 77 and 78 connected to a common tap which is grounded at 79. The windings 77 and 78 are respectively connected in series with diodes 80 and 81 to form the full wave rectifier 67. The opposite terminals of diodes 80 and 81 are connected to base 68*b* of transistor 68. Base 68*b* is biased beyond cut off by a battery 82 and a resistor 83 connected in series between base 68*b* and ground. The forward drop across diodes 80 and 81 and windings 77 and 78 establishes this bias. Emitter 68*e* of transistor 68 is connected directly to ground. Collector 68*c* is connected through a load resistor 84 and a battery 85 to ground. A resistor 86 is connected in parallel with resistor 84 and battery 85. Collector 68*c* is connected to an output terminal 87, and another output terminal 88 is connected to ground.

*Operation of FIG. 7*

The input impedance of the grounded base amplifier stage including transistor 65 is of the same order of magnitude as the output impedance of the winding 4, so that direct coupling may be used in the grounded base stage, thus avoiding the use of an impedance matching transformer. Another advantage of the grounded base configuration is that it has a higher cut off frequency than, for example, the grounded emitter configuration. A high cut off frequency is necessary in order to get an adequate response from the very brief duration (1¼ microseconds) signals received from the core.

It is required that the core sensing amplifier produce unipolar output signals in response to bipolar input signals. The full wave rectifier 67 inserted in the coupling between the stages of the amplifier produces this result, so that a signal from winding 4 appearing, for example, as a positive half-wave voltage followed by a negative half-wave, appears in the input of the final stage as a single positive half-wave.

It is desired to have the amplifier produce an output signal in response to a binary "1" signal from coil 4 and to have little or no output signal in response to a binary "0."

A core 1 is read by applying to both its input windings half-select signals of a polarity to switch the core from a binary "1" to a binary "0." If a binary "0" is stored in the core, substantially no change takes place in its magnetic condition, and a small signal appears in coil 4. If a binary "1" is stored, the magnetic field of the core is reversed, and a larger signal appears at the coil 4, which may have either positive or negative polarity. A binary "0" produces a signal of substantially smaller amplitude than the binary "1." A half-select energization of one of the input windings also produces a small signal. By having the final stage of the amplifier biased beyond cut off, the smaller signals such as the half-select and binary "0" signals, are clipped or suppressed if a sufficiently small memory array is used. Consequently, only binary "1" signals at the input produce output signals. With large array, zero signals produce output signals, but at an earlier time than "1" signals.

The resistor 83 performs two other functions, namely, it maintains reverse bias at the base of the second stage transistor 68 at high temperatures, and also provides good recovery time to the base circuit of that transistor. The load resistor 84 of the second stage should be large enough to prevent excessive collector current. The transistor is driven to saturation at the top of the swing, this overdrive providing a flat topped output pulse with a small rise time.

The time delay for signals passing through the amplifier of FIG. 7 has been found to be 0.4 microsecond for the particular transistors used.

FIG. 8

This figure illustrates a modified form of load circuit for the transistor 10 which may be employed in place of the load circuits used in FIGS. 1 and 6. In this load circuit, a single transistor 10 drives four tape-core transformers 90, 91, 92 and 93. Each of these transformers has primary windings 94 and 95, and a secondary winding 96. All the primary windings 94 are connected in series with the collector **10*c* of transistor 10. Each secondary winding 96 supplies current to a plurality of core driving coils just as the secondary winding 19** does in FIG. 1.

The additional primary windings 95 are used as inhibiting windings. The four transformers 90, 91, 92 and 93 are connected in a matrix, similar to the matrix connection of the storage cores 1. The transistor 10 produces an output signal of sufficient magnitude to serve as a select signal for all the primary windings connected in series with it. At the time of any given output signal from the transistor 10, all the transformers except one will be inhibited by energization of their windings 95 from additional driving amplifiers not shown. Consequently, only one of the transformers will be fully selected on each output pulse.

While the transistors in the circuit illustrated are junction transistors having their conductivity regions arranged in a particular sequence, it will be readily understood that transistors with the opposite sequences of those regions can be used alternatively, providing that all the polarities of the batteries are reversed, and other changes made in accordance with principles well understood in the art.

The following table shows by way of example particular values for the potentials of the various batteries and for the impedances of the various resistors and capacitors, in circuits which have been operated successfully. In some cases, the values are also shown in the drawing. These values are set forth by way of example only, and the invention is not limited to them nor to any of them. The diodes are considered to have substantially no impedance in their forward direction and substantially infinite impedance in the reverse direction.

TABLE I

| | | |
|---|---|---|
| Resistor **21** | | 1K |
| Battery **22** | volts | 130 |
| Battery **23** | do | 2 |
| Capacitor **25** | mmf | 3300 |
| Resistor **26** | | 1K |
| Battery **27** | volts | 50 |
| Resistor **28** | ohms | 10 |
| Battery **41** | volts | 55 |
| Resistor **42** | ohms | 62 |
| Battery **43** | volts | 60 |
| Resistor **44** | | 3K |
| Resistor **56** | | 15K |
| Battery **57** | volts | 15 |
| Capacitor **59** | mfd | .01 |
| Resistor **62** | | 10K |
| Battery **63** | volts | 5 |
| Resistor **64** | | 10K |
| Capacitor **69** | mfd | 10 |
| Resistor **70** | | 3.6K |
| Battery **71** | volts | 15 |
| Battery **82** | do | 15 |
| Resistor **83** | | 10K |
| Resistor **84** | | 1K |
| Battery **85** | volts | 5 |

While we have shown and described certain preferred embodiments of our invention, other modifications thereof will readily occur to those skilled in the art, and we therefore intend our invention to be limited only by the appended claims.

We claim:

1. A read amplifier for producing an output signal in response to a coil wound on a storage core comprising a grounded base transistor amplifier stage having its emitter directly coupled to said coil, a coupling transformer connected to the output of said grounded base stage, a full wave rectifier coupled to said coupling transformer, a grounded emitter transistor amplifier stage having its input connected to said rectifier, means biasing said grounded emitter amplifier stage beyond cut off, and means responsive to binary "1" signals to drive said grounded emitter stage to saturation.

2. An amplifier comprising a thyratron transistor having a junction emitter electrode, a current multiplying collector electrode and a base electrode, means connecting said base electrode to a common junction, means reversely biasing said collector electrode with respect to said common junction, said transistor having an internal feedback characteristic such that a substantial collector current flow may be initiated by application to said emitter electrode of a first starting potential having a predetermined polarity and magnitude with respect to said junction, and, once initiated, continues until the emitter electrode is shifted to a cut-off potential substantially separated from the starting potential and having a polarity with respect to said common junction opposite to that of the starting potential, means biasing said emitter electrode to a potential between said starting and cut-off potentials and effective to maintain said collector substantially nonconductive, signal input means for transmitting to one of said base and emitter electrodes an input signal potential of the same polarity and greater magnitude than said bias potential to establish current flow through said emitter electrode and through said collector electrode, and self-extinguishing means connected to said emitter electrode and responsive to the current flow therethrough, said self-extinguishing means being effective after termination of the input signal potential to swing the emitter electrode to a potential of the same polarity and greater magnitude than said cut-off potential, and thereby to cut off the current flows.

3. An amplifier as defined in claim 2, in which said self-extinguishing means includes an impedance effective upon a current flow therethrough to produce a potential swing at the emitter.

4. An amplifier as defined in claim 3, in which said self-extinguishing means includes a capacitor.

5. An amplifier as defined in claim 4, in which said capacitor is connected in series with the emitter.

6. An amplifier as defined in claim 2, in which said self-extinguishing means includes a delay line connected in series with the emitter.

7. An amplifier as defined in claim 4, including a resistor connected between said emitter electrode and said base electrode for discharging said capacitor.

8. An amplifier as defined in claim 2, in which said biasing means comprises a diode and a source of electrical potential poled in a sense to bias said emitter electrode non-conductively, said diode and said potential source being connected in series to the emitter electrode.

9. An amplifier as defined in claim 2, including an input transformer comprising a primary winding and a secondary winding, and means connecting said secondary winding to said base electrode.

10. An amplifier as defined in claim 2, in which said self-extinguishing means includes a resistor.

11. An amplifier as defined in claim 2, in which said self-extinguishing means comprises a second transistor having an emitter electrode and a collector electrode, and a base electrode, means connecting the collector electrode of the second transistor directly to the emitter electrode of the first transistor, means biasing the second transistor to cut-off, and signal input means for overcoming said biasing means and turning said second transistor on, load circuit means for said second transistor connected to the collector thereof, said load circuit means being effective when said second transistor turns on to swing the potential of the emitter of said first transistor so as to turn said first transistor on, said load circuit means being effective when said second transistor turns off, to swing the potential of the emitter of the first transistor in a direction to cut it off.

12. An amplifier as defined in claim 11, in which said load circuit means comprises a resistor connected between said emitter of the first transistor and ground.

13. Magnetic core stator apparatus, comprising at least one storage core having high remanence, a winding on said storage core, means for energizing said winding including a transformer having a high remanence core, a primary winding and a secondary winding, a resistor, a core driving circuit including in series the secondary winding, the resistor, and the storage core winding, said resistor having an impedance constituting a major proportion of the total load impedance of the core driving circuit, an amplifier driving said primary winding and comprising a thyratron transistor having a junction emitter electrode, a current multiplying collector electrode and a base electrode, means connecting said base electrode to a common junction, means reversely biasing said collector electrode with respect to said common junction, said transistor having an internal feedback characteristic such that a substantial collector current flow may be initiated by application to said emitter electrode of a first starting potential having a predetermined polarity and magnitude with respect to said junction, and, once initiated, continues until the emitter electrode is shifted to a cut-off potential substantially separated from the starting potential and having a polarity with respect to said common junction opposite to that of the starting potential, means biasing said emitter electrode to a potential between said starting and cut-off potentials and effective to maintain said collector substantially non-conductive, signal input means for transmitting to one of said base and emitter electrodes an input potential of the same polarity and greater magnitude than said bias potential to establish current flow through said emitter electrode and through said collector electrode, and self-extinguishing means connected to said emitter electrode and responsive to the current flow therethrough, said self-extinguishing means being effective after termination of the input signal potential to swing the emitter electrode to a potential of the same polarity and greater magnitude than said cut-off potential, and thereby to cut off the current flows, an output circuit for the amplifier connected between the collector electrode and the common junction including in series the primary winding and a source of substantially constant electric current, and means effective when the current flow from the transistor is cut off to by-pass said constant current around the primary winding and the transistor.

14. Magnetic core storage apparatus as defined in claim 13, in which said primary winding has one terminal connected to the collector electrode and the other terminal connected to the by-passing means, said by-passing means being effective to limit the potential between the collector electrode and the common junction.

15. An amplifier as defined in claim 13, in which said constant current source comprises a source of electrical potential and a resistor in series with said potential source and having an impedance high as compared to the other impedance elements in its circuit.

16. Magnetic core storage apparatus as defined in claim 13, in which said constant current source comprises a second transistor having a collector electrode, an emitter electrode and a base electrode, means connected in series with the emitter electrode for maintaining the current flow therefrom substantially constant, energy supply means connected in series with the base, and a connection between the collector electrode and said primary winding.

17. Magnetic core storage apparatus as defined in claim 13, comprising a read coil on said storage core and a read amplifier for producing signals from said read coil, said read amplifier comprising a grounded base transistor amplifier stage having its emitter directly coupled to said read coil, a coupling transformer connected to the output of said grounded base stage, a full wave rectifier supplied by said coupling transformer, a grounded emitter transistor amplifier stage having its input connected to said rectifier, means biasing said grounded emitter amplifier stage beyond cut off, and means responsive to binary "1" signals to drive said grounded emitter stage to saturation.

18. An amplifier for producing square wave output signals, comprising a transformer having a high remanence core, a primary winding and a secondary winding, a resistor, an output circuit including in series the secondary winding and the resistor, said resistor having an impedance constituting a major proportion of the total load impedance of the output circuit, a transistor having emitter, collector and base electrodes, means connecting the base electrode to a common junction, signal input means operable to switch the transistor between low current and high current conditions, a load circuit for the transistor connected between the collector electrode and the common junction and including in series the primary winding and a source of substantially constant electric current, and means effective when the transistor is in its high impedance condition to by-pass most of said constant current around the primary winding and the transistor.

(References on following page)

References Cited in the file of this patent

UNITED STATES PATENTS

| | | |
|---|---|---|
| 2,438,962 | Burlingame | Apr. 6, 1948 |
| 2,457,125 | Chatterjea et al. | Dec. 28, 1948 |
| 2,595,208 | Bangert | Apr. 29, 1952 |
| 2,596,142 | Gerwin | May 13, 1952 |
| 2,605,306 | Eberhardt | July 29, 1952 |
| 2,642,552 | Sager | June 16, 1953 |
| 2,686,262 | Wiley | Aug. 10, 1954 |
| 2,691,154 | Rajchman | Oct. 5, 1954 |
| 2,695,993 | Haynes | Nov. 30, 1954 |
| 2,739,300 | Haynes | Mar. 20, 1956 |
| 2,741,757 | Devol | Apr. 10, 1956 |
| 2,748,275 | Maron | May 29, 1956 |
| 2,798,169 | Eckert | July 2, 1957 |